Oct. 25, 1955 V. GENTILE, JR., ET AL 2,721,773
SLIP SLEEVE BEARING
Filed May 11, 1953 2 Sheets-Sheet 1

INVENTORS
VINCENT GENTILE JR.
VINCENT I. GENTILE
BY
Riche and Padlon
ATTORNEYS

Oct. 25, 1955  V. GENTILE, JR., ET AL  2,721,773
SLIP SLEEVE BEARING
Filed May 11, 1953  2 Sheets-Sheet 2
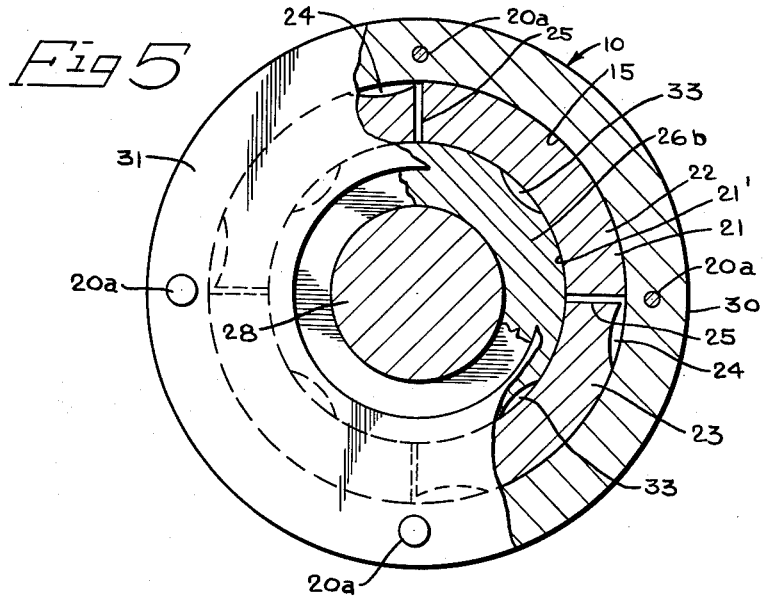
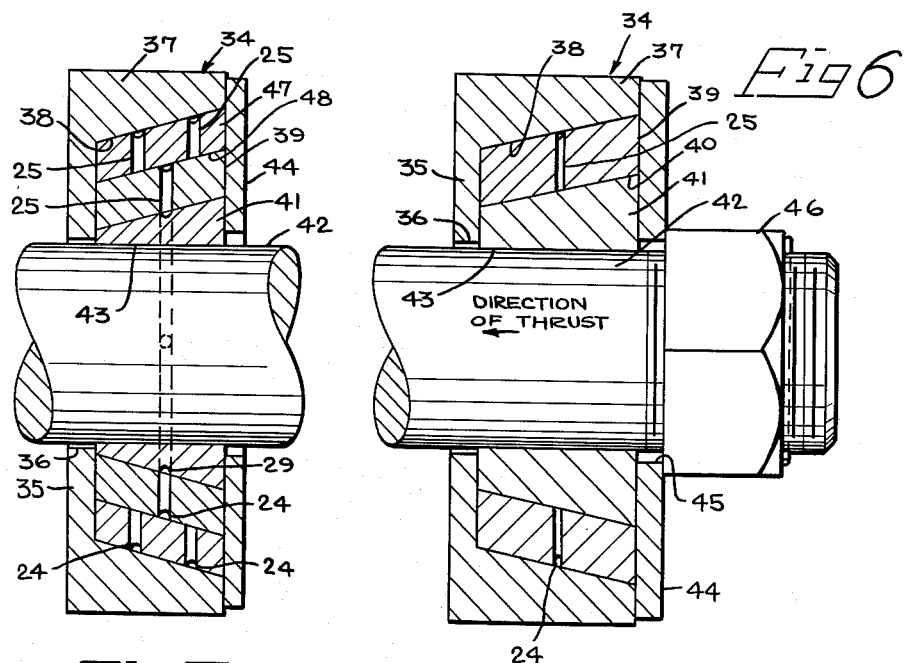
INVENTORS
VINCENT GENTILE JR.
VINCENT I. GENTILE
BY
Diche and Padlon
ATTORNEYS

United States Patent Office 2,721,773
Patented Oct. 25, 1955

2,721,773
SLIP SLEEVE BEARING

Vincent Gentile, Jr., and Vincent I. Gentile, Union, N. J.

Application May 11, 1953, Serial No. 354,242

8 Claims. (Cl. 308—121)

This invention relates to sliding bearings for high speed machinery. It is an object of the present invention to provide a sleeve bearing possessing the advantages of the conventional ball or roller bearing without the attendant disadvantages of high concentrated compressive stresses, and providing a positive method of lubrication.

A feature of the invention is the provision of one or more floating sleeves between shaft and bearing housing which sleeves are free to rotate with the shaft but at relatively slower angular velocities.

Another feature of the invention is the provision of means for positive circulatory lubrication between internal and external rubbing surfaces of said sleeves.

Still another feature of the invention is the facility for replacing worn bushings without disturbing or dismantling other parts of bearing.

The invention utilizes the viscous drag principle taught by Patent #2,617,301 dated November 11, 1952, issued to one of applicants, for producing positive and negative pressures at a series of pressure ports spaced around the external periphery of floating sleeves.

The invention together with its various features and objects will be understood by reference to the accompanying drawings forming a part of preferred embodiments thereof, and in which:

Fig. 5 is an end view, partly broken away, of another embodiment of the invention of Fig. 1;

Fig. 6 is a longitudinal vertical section of still another modification of the invention, and Fig. 7 is a longitudinal vertical section of yet another embodiment of the invention.

Like characters of reference refer to the same or to similar parts throughout the views.

Figure 3:
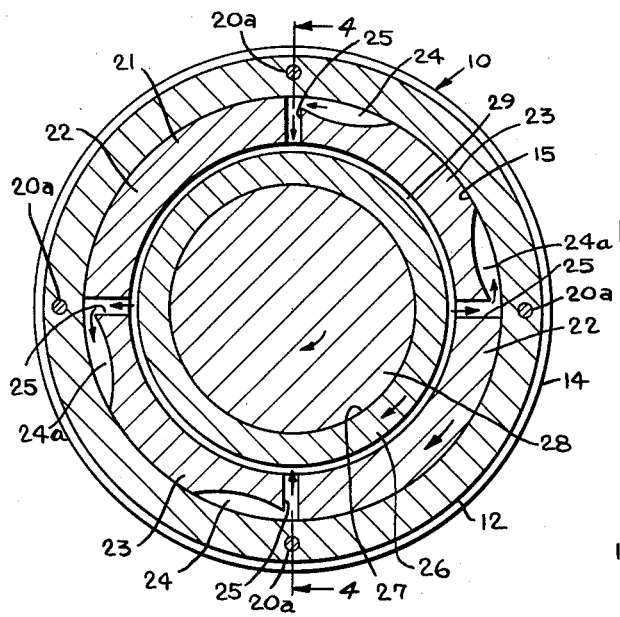
Fig. 3 is an exaggerated end view in section of a modification of the invention of Fig. 1 taken on line 3—3 of Fig. 4.
Figure 4:
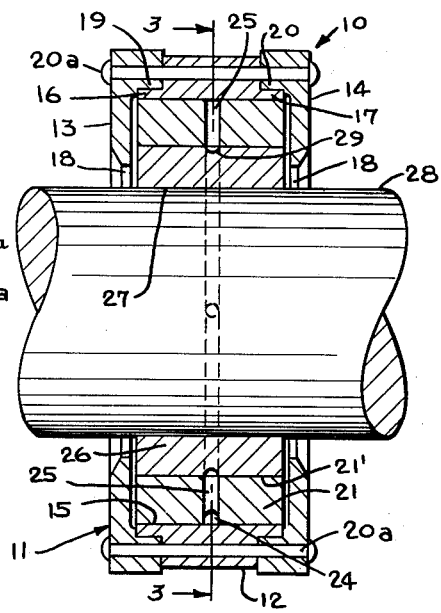
Fig. 4 is a sectional view taken on line 4—4 of Fig. 3.

Referring now to Figs. 3 and 4, a sleeve bearing 10, preferably of case hardened steel, is provided with an outer housing or casing 11 comprising a central annular ring 12 and outer rings 13 and 14. Ring 12 has a central axial bore 15 and is provided with continuous flanges 16 and 17 on its inner periphery. Rings 13 and 14 are provided with an axial bore 18 of a smaller diameter than the bore of ring 12 and have continuous flanges 19 and 20 on their outer periphery. Rings 13 and 14 are secured by a plurality of pins 20a or other similar means on each side of rings 12 so that flanges 19 and 20 abut flanges 16 and 17 respectively of ring 12.

Fitting snugly within the axial bore 15 of ring 12 and between rings 13 and 14, although the drawings have been exaggerated, for purposes of illustration, is a cylindrical sleeve or bushing 21 having a central axial bore 21'. Sleeve 21 comprises alternate circular shaped solid portions 22, and scooped portions 23 with spaced recesses or scoops 24 and 24a around the outer periphery. Radially extending channels or ports 25 are provided in the scooped portions 23 and extend between alternate ends of scoop 24 and 24a, and the inner periphery of sleeve 21. Inside axial bore 21' of sleeve 21 is an inner roller race or shaft bushing 26 having a central axial bore 27 and within which is secured a shaft or axle 28, by press fit so that the bushing and shaft rotate as a unit.

In the outer periphery of bushing 26 is a continuous peripheral groove 29, of approximately the same width as the radially extending ports 25 in the scooped portions and directly opposite them or in line with them, so that the ports and groove are in communication with one another and lubricant will continuously flow between them as more fully described hereinafter.

In operation, the bearing box holding sleeve bearing (not shown) is preferably filled one third with grease or oil lubricant, and shaft 28 and bushing 26 are driven or rotated, clockwise for example, by a source of power not shown. Bearing 10 is rigidly fixed within the bearing box so that there is relative angular motion between the housing, including ring 12, and the shaft and bushing. As the shaft and shaft bushing continue to rotate, the viscosity or viscous drag of the lubricant between the outer periphery or surface of bushing 26 and the inner surface or periphery of floating sleeve 21 causes sleeve 21 to be dragged or rotated in the same direction as the bushing, but at a slower speed, for ideal conditions, about one half of the R. P. M. of the shaft. An equilibrium condition is reached when positive drag on internal surface of sleeve 21 is equal to negative drag on external surface of bushing 26. The rotation of sleeve 21 with respect to stationary sleeve 12 creates a viscous drag around its external periphery which produces a positive pressure of lubricant on scoops 24 and a negative pressure on scoops 24a causing a continuous circulation of a film of lubricant between the inner and outer peripheries of sleeve 21 through ports 25. It is to be noted in accordance with the invention that the ends of ports 25 are preferably rounded off slightly so as to prevent any sharp edges from rupturing film of lubricant and break the surface tension thereof. The continuous peripheral groove 29 in bushing 26 acts as a reservoir, from which, and into which lubricant is continuously flowing from the viscous action above described, assisted to some extent by the centrifugal action of the spinning oil in peripheral groove 29. Thus, a positive and continuous circulation is maintained between rubbing surfaces as shown by the small arrows in Fig. 3.

Figure 1:
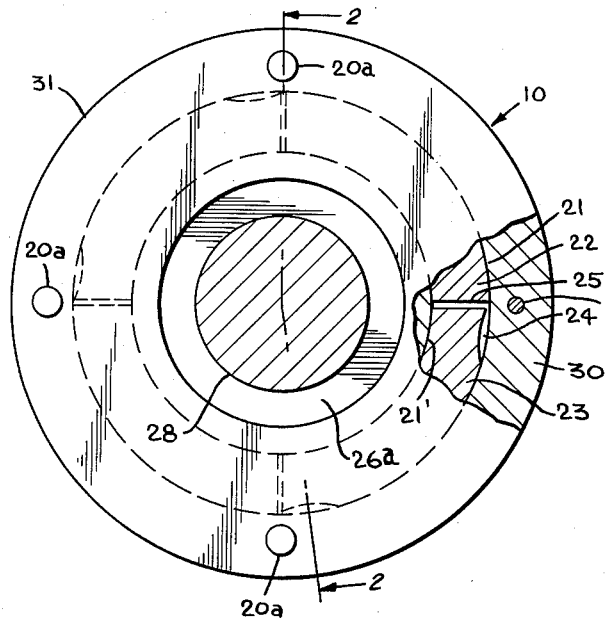
Fig. 1 is an end view, partly broken away, of a bearing embodying the invention.
Figure 2:
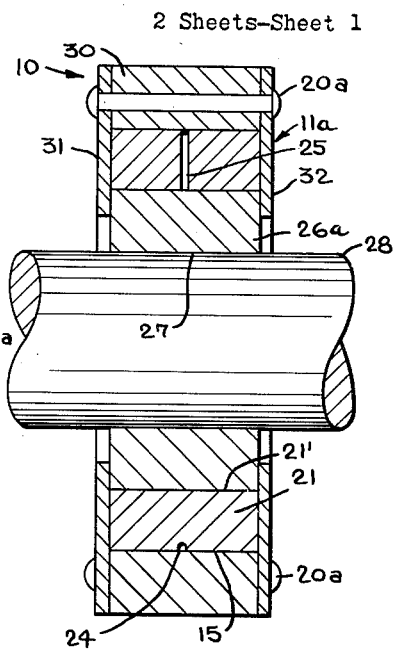
Fig. 2 is a longitudinal vertical section taken on line 2—2 of Fig. 1.

The embodiment of the invention illustrated in Fig. 1 and 2 is substantially the same as that of Figs. 3 and 4, except that housing 11a is provided with an annular ring 30, rectangular shaped in cross section, and is secured between flat annular rings 31 and 32. Bushing 26a also has no continuous peripheral groove as in the embodiment shown in Figs. 3 and 4. The operation of this embodiment is the same as that of Figs. 3 and 4.

In the modification of invention shown in Fig. 5, the structure and operation are substantially the same as that of Figs. 3 and 4 except that bushing 26b is provided with a plurality of spaced cups 33 in its outer periphery in line with ports 25 instead of having a continuous peripheral groove.

Referring to Fig. 6, the invention shown is substantially the same as that in Figs. 3 and 4, except that the invention is incorporated in a thrust bearing.

The bearing 34 of the invention comprises a cover 35 with a central opening 36 therein, and an annular ring or flange 37 having an inwardly tapered or frusto conical shaped axial bore 38 therein. An inwardly tapered or frusto conical shaped sleeve 39 fits within the bore 38, and has an inwardly beveled or frusto conical shaped axis bore 40 therein. Within bore 40 fits an inwardly tapered or frusto conical shaped shaft bushing 41 rigidly secured to a threaded shaft 42 extending through an axial bore 43 therein. A flat annular cover plate 44 having a central opening 45 therein is placed over shaft 42 and secured against sleeve 39 by a nut 46 threaded on the shaft to keep the sleeve from slipping out of the housing. No peripheral groove is provided in the bushing 41 of this modification of the invention. The operation is substantially the same as that in Figs. 3 and 4 except that the tapered or frusto conical shaped parts enable the bearing to take a thrust force in a left direction as shown in the drawing, as well as the usual normal radial load.

The embodiment of the invention shown in Fig. 7, is substantially the same as that of Fig. 6, except that an outer floating sleeve 47 is provided for relative movement with floating sleeve 39. Sleeve 47 is frusto conical shaped or inwardly tapered, has an inwardly tapered or frusto conical axial bore 48 therein, and is provided with spaced rows or sets of scoops 24 in the outer periphery thereof. Sleeve 47 is positioned within bore 38 of ring 37 and sleeve 39 fits within its axial bore 48. Bushing 41 is provided with the continuous peripheral groove 29 as in Fig. 3, in line with ports 25 of sleeve 39. The operation is substantially similar to that of Figs. 3 and 6 except that there are two sleeves 39 and 47, having relative movement with respect to one another, and with the shaft bushing.

For convenience, the conventional radial and thrust bearings have been selected to illustrate the application of principle involved. Obviously, the invention can be adapted with similar advantages to a pillow block bearing, outboard bearing, inboard bearing, and to any other type of sleeve bearing.

The advantages claimed for this device are:

(a) For a given shaft R. P. M. the relative rubbing speed of contact surfaces would be reduced to approximately one half if one floating bushing is used, one third if two intermediate bushings are used, etc. Thus the power required to overcome bearing friction, being a product of tangential resistance X speed, would decrease in the same ratio.

(b) In high speed machinery continuous and uninterrupted operation is frequently of far greater importance than the intrinsic value of the power spent in friction. Slight machining imperfections can cause bearing temperatures to rise to a point where the lubricant breaks down, the shaft seizes, and the unit has to be taken out of service. With the present invention the heat generated and temperature rise would be considerably less. Moreover, the provision of two or more rubbing surfaces constitutes, in effect, an inherent factor of safety. Thus if the frictional resistance around one of the bearing surfaces is high, the rubbing speed about the surface will decrease while the relative rubbing speed about the other bearing surface or surfaces will correspondingly increase. In general, the principle of least work will apply. The ratio of relative motions will automatically adjust themselves so that the total energy expended is a minimum.

(c) By a suitable selection of materials normal bearing wear can be confined to the intermediate floating bushings, which can be replaced when necessary, eliminating the necessity for renewing the entire bearing, a common practice with ball or roller bearings, and (d) While the frictional resistance in a bearing constructed in accordance with the present invention would be, at most, no more than that encountered in a conventional ball or roller bearing, it would have greater safe load carrying capacity because point and line contacts in the ball and roller bearings, respectively, would be replaced by surface contact.

While preferred embodiments of my invention have been described in connection with the accompanying drawings, it is to be understood that any modifications as to form, use, arrangement of parts and materials may be made without departing from the spirit and scope of the invention.

What is claimed is:

1. In a self lubricating bearing for a shaft, a housing having a frusto conical shaped axial bore, inner and outer sleeves having frusto conical shaped bores, said outer sleeve being arranged within said housing bore and said inner sleeve being arranged within the axial bore of said outer sleeve for relative angular motion therewith, said outer sleeve having at least two rows of recesses circumferentially spaced around its outer periphery, and said inner sleeve having at least one row of recesses circumferentially spaced around its outer periphery, radial channels connecting alternate ends of said recesses and axial bores of said sleeves, and a frusto conical shaped shaft collar having a continuous peripheral groove directly opposite the radial channels in said inner sleeve and in communication therewith, said collar being arranged within the axial bore of said inner sleeve for relative angular movement therewith.

2. A self lubricating bearing according to claim 1 wherein said recesses are successively spaced around outer peripheries of said inner and outer sleeves.

3. A self lubricating bearing for a rotating shaft comprising means housing said shaft, at least one sleeve within said housing and surrounding said shaft for relative angular motion therewith, said sleeve being provided with successively placed pressure and suction ports extending from the inner to the outer periphery thereof, and having a plurality of recesses around its outer periphery, said recesses being disposed to form alternate pressure and suction means communicating with the ports for the continuous circulation of lubricant between the inner and outer surfaces of said sleeve.

4. A self lubricating bearing according to claim 3 wherein the recesses extend between the inner and outer sleeve.

5. A self lubricating bearing for a rotating shaft comprising means for housing said shaft, at least one sleeve within said housing and surrounding said shaft for relative angular motion therewith, said sleeve being provided with diametrically opposed radial channels extending through the sleeve and slotted recesses around its outer periphery, one recess being arranged clockwise, and the next succeeding recess being arranged counter-clockwise of its respective connecting radial channel, said radial channels and recesses forming alternate pressure and suction ports for the continuous circulation of lubricant between the inner and outer surfaces of said sleeve.

6. A self lubricating bearing according to claim 5 having a mating journal for said bearing, said journal being provided with a continuous peripheral groove, and directly opposite channels in said sleeve and in communication therewith.

7. A self lubricating bearing for a shaft according to claim 5 with a housing having an axial bore therein, a sleeve with an axial bore disposed in the axial bore of the housing, a shaft bushing arranged for movement with said shaft, said bushing having a lubricant bearing pocket in its entire periphery adapted to act as a lubricant container.

8. A sliding bearing for a rotating shaft comprising a housing with an axial bore, at least one sleeve arranged within the axial bore of said housing for relative angular motion therewith, a cylindrical shaft bushing arranged within the axial bore of said sleeve for relative angular motion therewith, said sleeve having equispaced recesses in its outer periphery forming scooped areas and radial ports connecting alternate ends of said recesses with the internal surface of said sleeve, said recesses being successively arranged whereby one recess is in counter-relation to the next successive one, so that said shaft bushing is provided with a continuous peripheral groove in the same transverse plane with the axis of said radial ports and is in communication therewith.

References Cited in the file of this patent

UNITED STATES PATENTS 501,727     Moore     July 18, 1893

FOREIGN PATENTS 553,673     Great Britain     July 1, 1943